No. 621,937. Patented Mar. 28, 1899.
J. H. NIEMANN.
FILTER FOR ATTACHMENT TO WATER TAPS.
(Application filed July 9, 1898.)

(No Model.)

Witnesses
M. R. Jones
M. G. Stewart

John Henry Niemann
Inventor
by Stewart & Stewart
his Attorneys

THE NORRIS PETERS CO., PHOTO-LITHO., WASHINGTON, D. C.

United States Patent Office.

JOHN HENRY NIEMANN, OF RICHMOND, VICTORIA.

FILTER FOR ATTACHMENT TO WATER-TAPS.

SPECIFICATION forming part of Letters Patent No. 621,937, dated March 28, 1899.

Application filed July 9, 1898. Serial No. 685,553. (No model.)

*To all whom it may concern:*

Be it known that I, JOHN HENRY NIEMANN, chemist, a subject of the Queen of Great Britain and Ireland, and a resident of 140 Swan street, Richmond, in the Colony of Victoria, have invented a certain new and useful Improved Filter for Attachment to Water-Taps, (application being made in the Colony of Victoria on the 29th of March, 1898, the same being numbered 15,071, but for which Letters Patent have not yet been issued,) of which the following is a specification.

The object of my invention is to provide a filter or filtering-bag which shall be inexpensive and therefore within the reach of every household, rapidly attached to any shape or description of tap, and within a few seconds just as easily detached and cleansed.

In carrying out my invention a flexible pocket or bag is employed, provided with a bottom consisting of a diaphragm of suitable filtering material—such as sponge, felt, &c.—which may be compressed and of a suitable shape, preferably that of a disk or inverted cone. This bag is provided with cords or other suitable means for detachably closing and securing its mouth about the end of a tap or faucet and also for detachably securing it to the faucet, so as to prevent its being pulled off therefrom when in use.

My invention consists in a filter constructed and arranged as hereinafter set forth and claimed.

Figure 1:
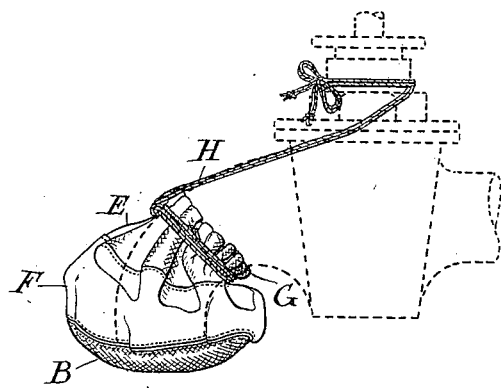
Figure 2:
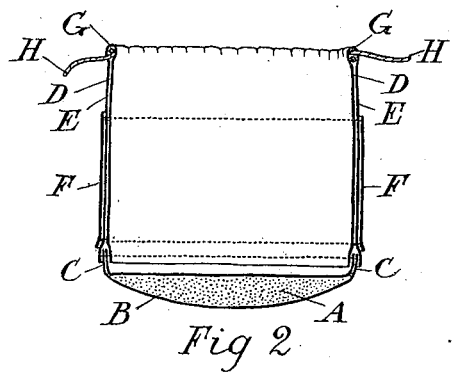
Figure 3:
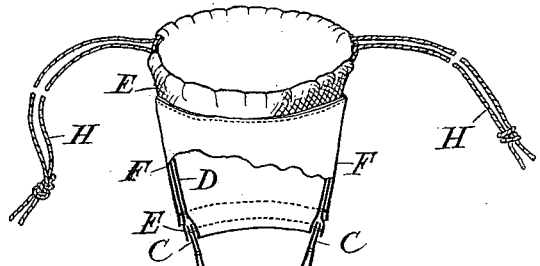

Referring to the drawings, which form a part of this specification, Figure 1 represents a view of a filtering-bag secured to a tap, which tap is shown in dotted lines. The strings on this have contracted the bag's neck around the said tap. After being knotted the strings, in order that the bag may not be accidentally blown off the tap, may be tied around the tap-body, as shown. Fig. 2 represents in section a bag, showing the filtering medium, the envelop, its selvage edge, the cylindrical wall, the channel-way, and the tightening-strings. Fig. 3 shows, partly in section, a filter having a hollow-coned filtering medium incased by an envelop suspended to cylindrical walls.

Similar letters of reference indicate similar or corresponding parts where they occur in the several views.

On reference to the drawings and Figs. 1 and 2 it will be seen that A is the filtering medium, surrounded by an envelop B. This envelop has a selvage edge C around it, which is sewed or otherwise attached to two cylindrical walls D and E. The inner wall D may be of either canvas, calico, or other material or of waterproof, while the outer one, E, is of waterproof material or covered with a coating F of the same. At the top of the two walls is a channel-way G, formed in any well-known manner, in which travel two pieces of string H. These tightening-strings H are threaded through the channel-way in such a manner that on drawing on the string ends the neck of the bag contracts.

On reference to Fig. 3 it will be seen that the filtering medium A is compressed in the form of a hollow cone and retained in that shape by the envelop B and the cross and other stitches J. Its selvage edge C is secured to the walls D and E, which are contracted, as before described. In this form of medium the hollow inverted cone very readily accommodates itself to any diameter of tap. When, also, the walls are pressed upwardly and contracted around the said tap, a water-tight joint is most effectually made.

The sponge or felt before being placed in the envelop may be treated with any suitable chemical solution, and, as can be well understood, the envelop is easily cleaned either by immersion in boiling water or a solution of permanganate of potash. When turned inside out, the interior of the bag can not only be thoroughly inspected, but just as thoroughly cleansed from all foreign matter.

The bag, as before said, is easily applied, since it is only requisite to place its neck around the tap and with the left hand compress the medium tightly against the tap-bottom. The strings are then drawn on and knotted. If necessary, they may be further strained over and around the tap-body, or there may be separate or holding-up strings for holding the filter onto the tap to those that contract the neck; but if ordinary care is used these are not requisite, since a continuous stream or drip of water percolates through and in a perfectly fit state to drink.

Having now described my invention, what I claim as new, and desire to secure by Letters Patent, is—

1. A filter consisting of a flexible bag or pocket having its bottom formed of a diaphragm of filtering material and means for detachably securing and closing the mouth of the bag about a tap or faucet, and also retaining the filter on said faucet substantially as set forth.

2. A filter consisting of a flexible bag or pocket having its bottom formed of a diaphragm of compressed filtering material and means for detachably securing and closing the mouth of the bag about a tap or faucet, and also retaining the filter on said faucet, substantially as set forth.

3. A filter consisting of a flexible bag or pocket having its bottom formed of a diaphragm of filtering material of a conical shape and means for detachably securing and closing the mouth of the bag about a tap or faucet, and also retaining the filter on said faucet substantially as set forth.

4. In an improved filter for attachment to water-taps the combination of a compressed filtering-sponge incased within a calico, canvas or other envelop, an outer cylindrical suspending-wall of waterproof material and an inner wall of canvas, tightening-strings traveling in a channel-way and closing around the top of the said walls all as and for the purposes hereinbefore described and as illustrated in the drawings.

5. In an improved filter for attachment to water-taps a compressed filtering medium suspended from two cylindrical walls above which are tightening-strings traveling in a channel-way, said strings being of sufficient length to be strained over and around the tap-body, as and for the purposes hereinbefore described.

6. In an improved filter for attachment to water-taps a compressed medium surrounded by an envelop of flannel, canvas or other material having a selvage edge and suspended from two cylindrical walls an outer one of waterproof material or covered with a coating of the same and an inner one of canvas, calico or other substance all as and for the purposes hereinbefore described and as illustrated in the drawings.

In witness whereof I have hereunto set my hand in presence of two witnesses.

JOHN HENRY NIEMANN.

Witnesses:
 CECIL W. LE PLASTRIER,
 CHARLES SOUTTER.